United States Patent [19]
Inoue

[11] Patent Number: 5,825,932
[45] Date of Patent: Oct. 20, 1998

[54] METHOD OF ESTABLISHING HALFTONE DOT THRESHOLDS, APPARATUS FOR GENERATING BINARY DATA, AND IMAGE FILM/PLATE-MAKING SYSTEM

[75] Inventor: Yoshiaki Inoue, Kanagawa-ken, Japan

[73] Assignee: Fuji Photo Film Co., Ltd., Kanagawa-Ken, Japan

[21] Appl. No.: 651,609

[22] Filed: May 22, 1996

[30] Foreign Application Priority Data

May 23, 1995 [JP] Japan ..................................... 7-123922

[51] Int. Cl.$^6$ ........................................................ H04N 1/405
[52] U.S. Cl. ........................... 382/237; 382/270; 358/456; 358/298
[58] Field of Search ..................................... 382/237, 270; 358/456, 298, 457, 534, 535, 536; 395/109

[56] References Cited

U.S. PATENT DOCUMENTS

4,773,734  9/1988  Inoda ....................................... 358/298
4,987,498  1/1991  Shimazaki ............................... 358/456

Primary Examiner—Scott Rogers
Attorney, Agent, or Firm—Sughrue, Mion, Zinn, Macpeak & Seas, PLLC

[57] ABSTRACT

A supercell is divided into halftone dot cells each with a highlight point at center and halftone dot cells each with a shadow point at center. Thresholds 0, 1, 2, 3, . . . assigned to pixels in the halftone dot cells each with a highlight point at center and thresholds N, N-1, N-2, N-3, . . . assigned to pixels in the halftone dot cells each with a shadow point at center are alternately determined, i.e., determined in the order of 0→N→1→N-1→, . . . →3→N-3. When the density of an original image is high, the number of blackened pixels in the halftone dot cells each with a highlight point at center and the number of blank pixels in the halftone dot cells each with a shadow point at center are equalized to each other, thus preventing moire stripes from being produced which would otherwise be caused by a periodic change in the number of blackened pixels in the halftone dot cells.

10 Claims, 12 Drawing Sheets

METHOD OF ESTABLISHING HALFTONE DOT THRESHOLDS, APPARATUS FOR GENERATING BINARY DATA, AND IMAGE FILM/PLATE-MAKING SYSTEM

BACKGROUND OF THE INVENTION

1. Field of the Invention

The present invention relates to a method of establishing halftone dot thresholds and an apparatus for generating binary data, suitable for use in an image recording apparatus or the like for producing a halftone dot image film, and an image film/plate-making system including such an image recording apparatus for producing a halftone dot image film or plate.

2. Description of the Related Art

There has recently been known a halftone dot generating technique for establishing a supercell on a pixel grid determined by an output resolution, dividing the supercell into halftone dot cells, and assigning a threshold to each of pixels in the halftone dot cells for thereby establishing a halftone dot threshold.

For details of a process of generating halftone dots in relation to a supercell, see, for example, "POSTSCRIPT SCREENING" written by Peter Fink, published by Adobe Systems Incorporated in 1992.

By making up a supercell of a plurality of halftone dot cells, it is possible to change the screen ruling and dot angle in smaller intervals for thereby selecting values closer to indicated screen ruling and dot angle settings.

A pixel grid comprises a set of pixels as blackening units. The pixel grid may be imaged as a matrix of vertical and horizontal arrays of pixels.

Figure 12A:
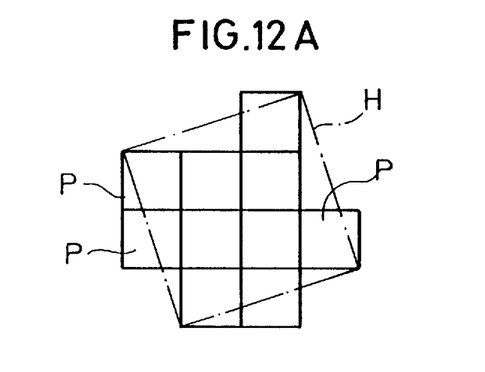
FIG. 12A is a diagram showing the relationship between a tilted halftone dot cell and pixels.

As shown in FIG. 12A of the accompanying drawings, a halftone dot cell H comprises 10 pixels P (actually, more pixels, e.g., 256 pixels, depending on the gradation of an image to be produced, on a pixel grid. The halftone dot cell H is usually represented by a square shape as indicated by the dot-and-dash line.

In FIG. 12A, the halftone dot cell H has a dot angle of ($\frac{1}{3}$) [rational tangent RT $\{RT=(\frac{1}{3})\}$].

Figure 13A:
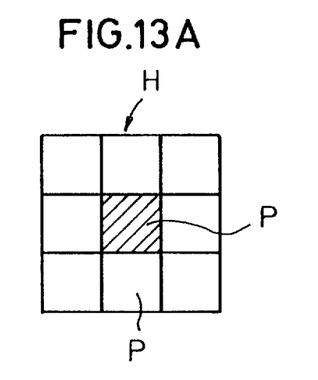
FIG. 13A is a diagram showing the relationship between an untilted halftone dot cell and pixels.

FIG. 13A of the accompanying drawings shows a halftone dot cell H having a dot angle of 0° [rational tangent RT (RT =0)].

Thresholds (not shown) that are assigned to the respective pixels of the halftone dot cell H are of values progressively greater outwardly from the center of the halftone dot cell H. Therefore, the pixel P at the center of the halftone dot cell H is first in the blackening sequence. In FIG. 13A, the pixel P which is in the first place in the blackening sequence is blackened as shown hatched.

Figure 12B:
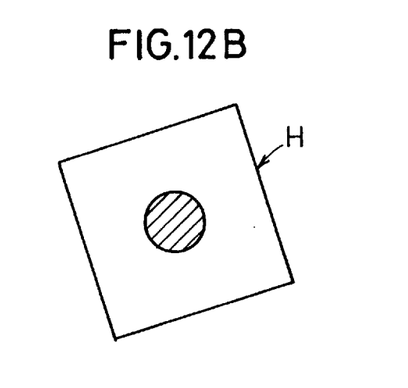
FIG. 12B is a diagram of the tilted halftone dot cell.
Figure 13B:
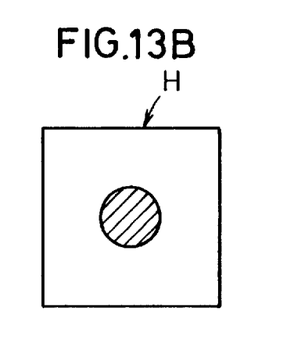
FIG. 13B is a diagram of the untilted halftone dot cell.

The halftone dot cell H which is blackened successively from its center is represented by a square shape with a hatched circle placed therein, as shown in FIG. 13B of the accompanying drawings which corresponds to FIG. 13A. The halftone dot cell H shown in FIG. 12A, which is blackened successively from its center, is also represented by a square shape with a hatched circle placed therein, as shown in FIG. 12B of the accompanying drawings which corresponds to FIG. 12A. In FIG. 12B, the halftone dot cell H is tilted the same angle as the halftone dot cell H shown in FIG. 12A.

Figure 14:
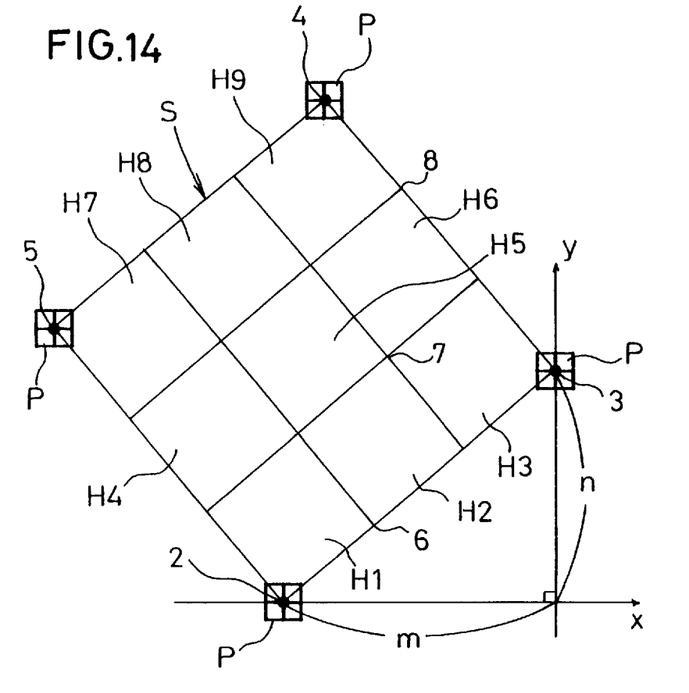
FIG. 14 is a diagram showing a supercell.

FIG. 14 of the accompanying drawings schematically shows a supercell S which is made up of nine halftone dot cells H1~H9. As shown in FIG. 14, the supercell S has four vertexes 2~5 which are required to be aligned with vertexes of respective pixels P. Vertexes 6, 7, 8, for example, shared by the halftone dot cells H1~H9 do not need to be aligned with vertexes of pixels P.

As shown in FIG. 14, the supercell S is placed in a two-dimensional plane having perpendicular x- and y-axes. If the number of pixels on the x-axis from the origin to the vertex 2 is "m" and the number of pixels on the y-axis from the origin to the vertex 3 is "n", then the supercell S has a rational tangent RT=(n/m) which corresponds to dot angle.

In each of the halftone dot cells H1~H9, there are established thresholds of 0, 1, 2, . . . , 255 assigned to respective pixels that are positioned in a spiral pattern extending outwardly nearly from the center of the halftone dot cell.

A halftone dot cell in which thresholds are assigned respectively to pixels is referred to as a "halftone dot cell threshold template". A supercell in which thresholds are assigned respectively to pixels is referred to as a "supercell threshold template".

For the sake of brevity, it is assumed that the size of pixels of an original image to which such a supercell threshold template is applied is the same as the size of the halftone dot cell H, so that a blackening process according to a so-called density pattern method will be considered.

If the image data of such an original image are of a value close to 255 where the halftone dot percentage is 100%, then each of the halftone dot cells H1~H9 is in an almost fully blackened state.

Each of the halftone dot cells H1~H9 in which the thresholds are arranged as described above is blackened successively nearly from its center, with a highlight point (having a value of 0 in the above example) positioned near its center. Such a halftone dot cell is referred to as a halftone dot cell with a highlight point at center, or a halftone dot cell with a small point at center because its blackened point is generally small on the highlight size. The halftone dot cells H shown in FIGS. 12B and 13B are a halftone dot cell with a highlight point at center.

In the supercell S composed of the halftone dot cells H1~H9 each with a highlight point at center, however, the number of pixels which are not periodically blacked, i.e., the number of blank pixels, varies in the vicinity of the vertexes 2~8 of the halftone dot cells H1~H9. Specifically in an extreme example, the vertex 6 is blackened, the vertex 7 is left blank, and the vertex 8 is blackened.

Within the supercell S, blackened pixels in the halftone dot cells H1~H9 are distributed substantially uniformly. However, the number of blank pixels cannot be controlled, and periodically varies in the halftone dot cells H1~H9. Such a periodic variation in the number of blank pixels results in a grid-like or striped moirè, which may be considered to be a moirè caused by the frequency of the halftone dots and the output resolution.

Figure 15:
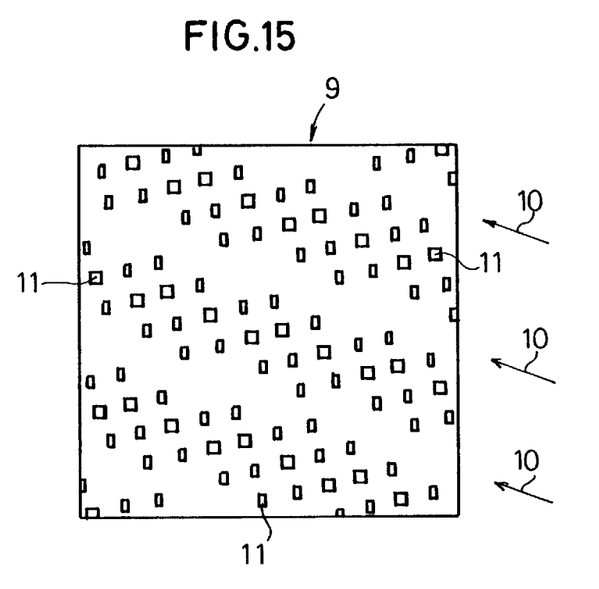
FIG. 15 is a diagram of an output image with moirè stripes produced when image data are outputted with a high halftone dot percentage.

FIG. 15 of the accompanying drawings shows a specific simulated image of moirè stripes produced on an output image 9 when image data are outputted with a high halftone dot percentage to generate a shadow area. It can be seen from FIG. 15 that the moirè stripes appear clearly in the direction indicated by the arrows 10. In FIG. 15, square dots 11 represent blank pixels, with other pixels being blackened.

SUMMARY OF THE INVENTION

It is therefore an object of the present invention to provide a method of establishing halftone dot thresholds, an apparatus for generating binary data, and an image film/plate-making system, which make it possible to prevent moire stripes from being produced on an output image.

Another object of the present invention to provide a method of establishing halftone dot thresholds, an apparatus for generating binary data, and an image film/plate-making system, which make it possible to prevent moire stripes from being produced when image data are outputted with a high halftone dot percentage.

The above and other objects, features, and advantages of the present invention will become more apparent from the following description when taken in conjunction with the accompanying drawings in which a preferred embodiments of the present invention is shown by way of illustrative example.

DETAILED DESCRIPTION OF THE PREFERRED EMBODIMENT

The present invention will be described below with reference to FIGS. 1 through 11. Those parts shown in FIGS. 1 through 11 which are identical to FIGS. 12A, 12B through 15 are denoted by identical reference characters, and will not be described in detail. The present invention will also be described, if necessary, with reference to FIGS. 12A, 12B through 15.

Figure 1:
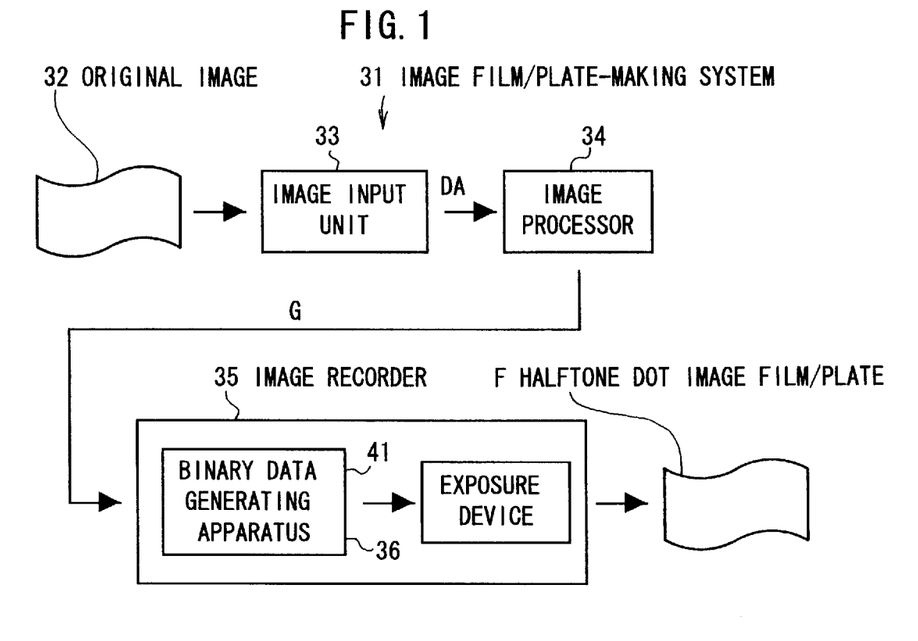
FIG. 1 is a block diagram of an image film/plate-making system according to the present invention.
Figure 2:
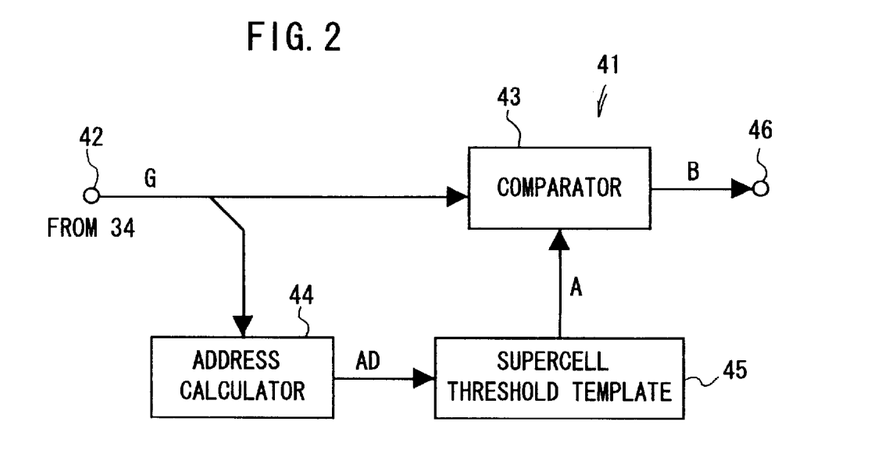
FIG. 2 is a block diagram of an apparatus for generating binary data in the image film/plate-making system shown in FIG. 1.

FIGS. 1 and 2 show an image film/plate-making system 31 according to the present invention which includes an apparatus 41 for generating binary data or a binary data generating apparatus 41.

As shown in FIG. 1, an original image 32 as of a photograph image is supplied to an image input unit 33 which comprises an image scanner. The image scanner of the image input unit 33 converts the supplied original image 32 into 8-bit digital image data (hereinafter referred to as "image data") DA of pixels in C (cyan), M (magenta), and Y (yellow) separations or C, M, Y, and K (black) separations. The image data DA are then processed into image data G through various image processing operations including color correction, sharpness enhancement, etc. by an image processor 34.

The image data G are then supplied to the binary image generating apparatus 41 in an image recorder 35.

As shown in FIG. 2, the image data G supplied to the binary data generating apparatus 41 are supplied from an input port 42 to a comparison input terminal of a comparator 43. The image data G are also supplied to an address calculator 44 which calculates addresses AD (x, y) indicative of x- and y-axis addresses (see FIG. 14 for the x- and y-axes) on a supercell threshold template 45 from the image data G. The supercell threshold template 45 reads a threshold (8-bit threshold data) A from a memory cell depending on the calculated address AD, and supplies the threshold to a reference input terminal of the comparator 43. Actually, the supercell threshold template 45 is stored in a ROM (read-only memory), for example, and is read from the ROM by a CPU (central processing unit).

The comparator 43 compares the image data G with the threshold data A to convert the image data G into binary data B according to the following equations (1) and (2):

$$G \geq A \rightarrow 1 \text{ (blackened)} \tag{1}$$

$$G < A \rightarrow 0 \text{ (blank: unblackened)} \tag{2}$$

The binary data B generated by the comparator 43 are supplied through an output port 46 to an exposure device 36 (see FIG. 1) in the image recorder 35.

In the exposure device 36, a laser beam which is modulated, i.e., selectively turned on and off, by the binary data B is applied to a photographic film to form a latent image thereon, generating a halftone-dot image film F which is outputted.

The outputted halftone-dot image film F is developed and then processed into a printing plate or a presensitized plate. The printing plate or the presensitized plate is set in a printing press, which operates to transfer the image from the printing plate or the presensitized plate onto a sheet, thereby producing a desired hard copy.

As described above, the image film/plate-making system 31 shown in FIG. 1 operates to generate a halftone-dot image film F in the image recorder 35 and thereafter produce a printing plate or a presensitized plate from the halftone-dot image film F. However, the image film/plate-making system 31 may be a system which has an image recorder for producing a printing plate or a presensitized plate directly from image data G, rather than generating a halftone-dot image film F in the first place. Alternatively, the image film/plate-making system 31 may be a system which has an image recorder capable of producing either a halftone-dot image film F or a printing plate or a presensitized plate.

A process of generating a threshold to be established in the supercell threshold template 45 will be described below with reference to FIG. 3.

First, computational input parameters (m, n, k, L) are established based on output conditions for the halftone-dot image film F in a step S1.

The parameters (m, n, k, L) may be determined in any order. For example, the parameters (m, n) relative to a dot angle (rational tangent RT) are first determined. A dot angle which can actually established with respect to a desired dot angle is of a value produced by dividing the number "n" of pixels on the y-axis (see FIG. 14) by the number "m" of pixels on the x-axis {(n/m)=rational tangent RT}. The rational tangent RT (=n/m) is selected so as to be closest to the desired dot angle in relation to the length L of a side of the supercell S. If the dot angle is represented by θ, then the rational tangent RT is expressed by θ=arctan (n/m). To achieve the dot angle θ=15° that is used in printing, the rational tangent RT=n/m may be of a value of 3/11, 4/15, 7/26, 11/41, 15/56, . . . .

Then, the parameters (L, k) are determined in view of an output resolution as the length L of a side of the supercell S for obtaining a desired screen ruling (e.g., the length Q of a side of a halftone dot cell H described later with reference to FIG. 4) and the number "k" of halftone dot cells H of one supercell S. These parameters (L, k) are determined simultaneously.

Specifically, when the length L of a side of the supercell S is determined, the actual length of the supercell S is known, and when the number "k" is determined as a parameter, it is determined how many halftone dot cells Hh can be put in the supercell S, and the substantial screen ruling, i.e., the length Q of one side of a halftone dot cell H, is determined. In this embodiment, the parameters (m, n) relative to the dot angle are set to (3, 1), and the number "k" of halftone dot cells H in one supercell S is set to k=10.

Then, the supercell S is divided into halftone dot cells Hh each with a highlight point at center by a group of straight lines defined according to the following equations (3) and (4):

$$nx-my+(p-n)L=0 \quad (3)$$

$$\{p=-(n-1)\sim(n-1)\}$$

$$mx-ny-qL=0 \quad (4)$$

$\{q=0\sim(m+n-1)$

Figure 4:
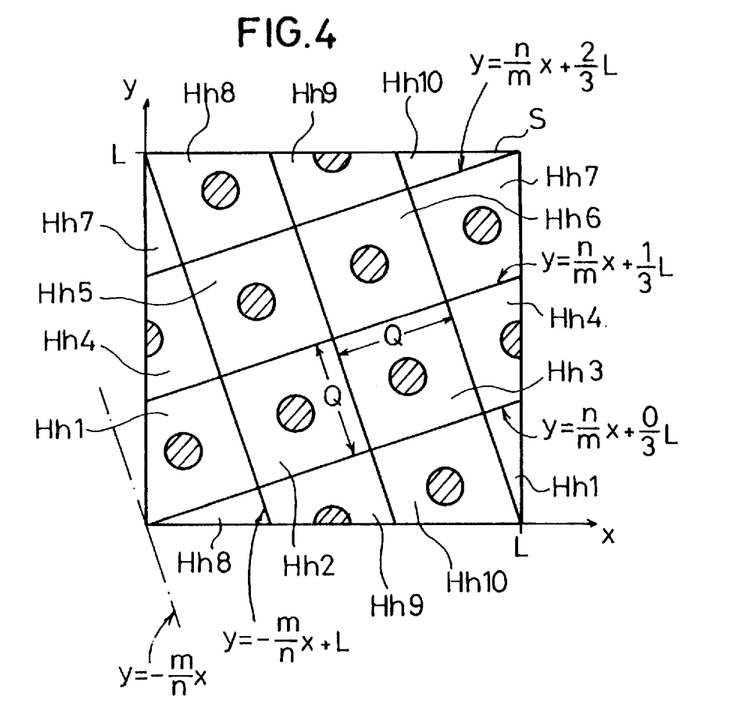
FIG. 4 is a diagram of a supercell divided into halftone dot cells each with a highlight point at center.

FIG. 4 shows a supercell S whose sides have a length L and which is divided into halftone dot cells Hh1~Hh10 each with a highlight point at center and sides having a length Q, by straight lines according to the equations (3) and (4). The halftone dot cells Hh1~Hh10 are indicated by respective hatched circles at their center which represent that the blackening starts from the center as the threshold varies from small to large values.

Figure 3:
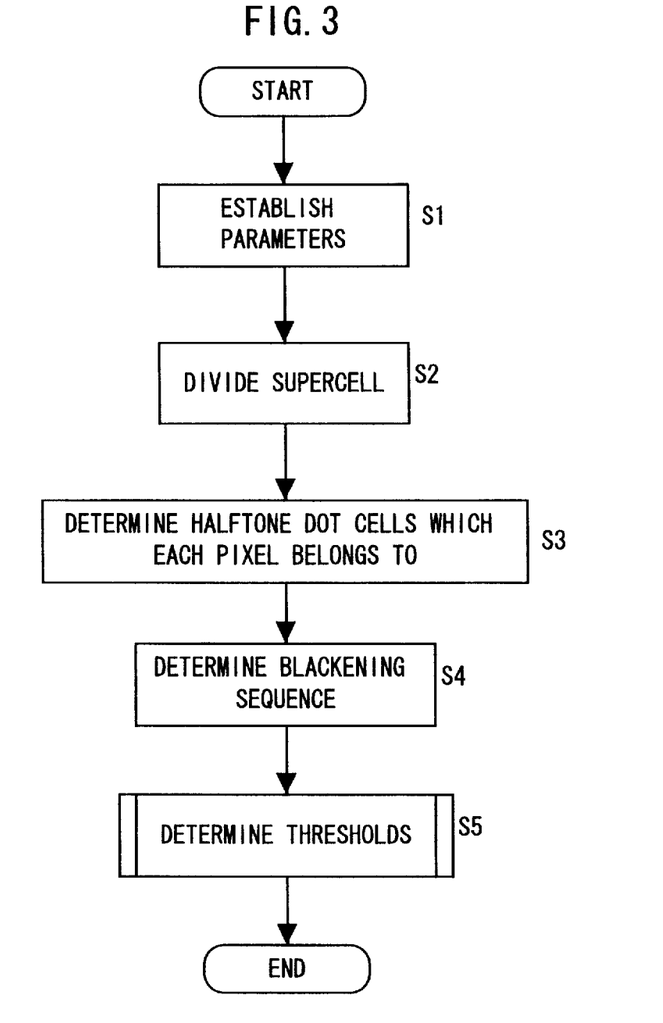
FIG. 3 is a flowchart showing an algorithm of determining thresholds of a supercell threshold template.

In a step S2 shown in FIG. 3, the same supercell S is divided into halftone doe cells Hs each with a shadow point at center.

Figure 5:
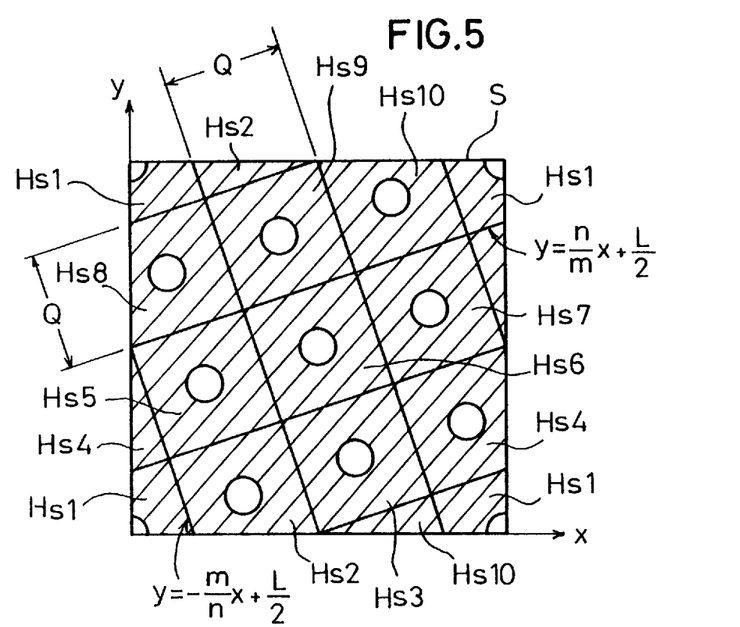
FIG. 5 is a diagram of a supercell divided into halftone dot cells each with a shadow point at center.

FIG. 5 shows a supercell S which is divided into halftone dot cells Hs1~Hs10 each with a shadow point at center and sides having a length Q. The halftone dot cells Hs1~Hs10 are shown hatched except circles at their center which represent that the blackening starts from outside the halftone dot cells Hs1~Hs10 as the threshold varies from small to large values. The supercell S is divided into halftone dot cells Hs1~Hs10 by a group of straight lines according to the equation (3) where y=y+(⅙)L and the equation (4) where y=y+(½)L.

The positions of the respective halftone dot cells Hs1~Hs10 each with a shadow point at center are displaced half Q/2 of the length Q in the direction of the straight line according to the equation (3), from the respective positions of the halftone dot cells Hh1~Hh10 each with a highlight point at center, and further displaced half Q/2 of the length Q in the direction of the straight line according to the equation (4), from the above displaced position.

Figure 6:
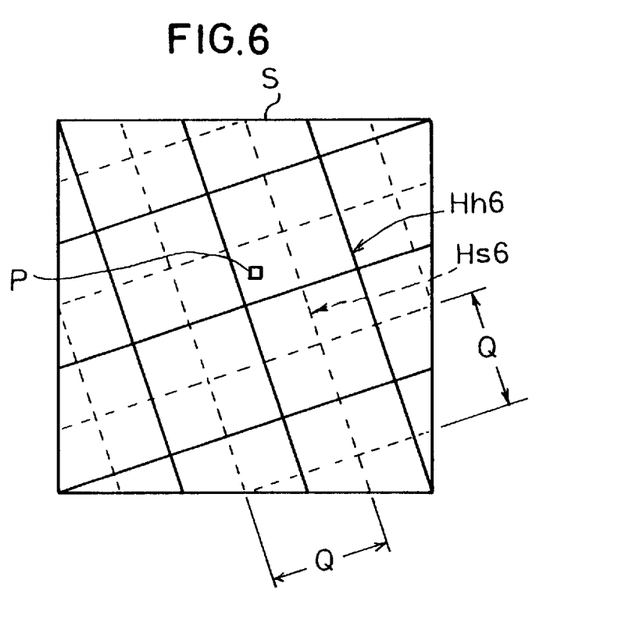
FIG. 6 is a diagram illustrative of the definition of the position in which a pixel exists.

FIG. 6 shows the halftone dot cells Hh each with a highlight point at center which are indicated by the solid lines over the supercell S, and the halftone dot cells Hs each with a shadow point at center which are indicated by the dotted lines over the halftone dot cells Hh.

As can be seen from FIG. 6, the vertexes (the points of intersection of the dotted lines) of the halftone dot cells Hs each with a shadow point at center are aligned with the centers of the halftone dot cells Hh each with a highlight point at center. A study of the position of a pixel P which is schematically shown in FIG. 6 indicates that each pixel P belongs to one halftone dot cell Hh with a highlight point at center and one halftone dot cell Hs with a shadow point at center (a total of two halftone dot cells). The pixel P shown in FIG. 6 specifically belongs to the halftone dot cell Hh6 with a highlight point at center and the halftone dot cell Hs6 with a shadow point at center.

Then, it is determined in a step S3 which one of the halftone dot cells Hh1~Hh10 each with a highlight point at center and which one of the halftone dot cells Hs1~Hs10 each with a shadow point at center, each pixel P whose coordinates are (x, y) in the supercell S belongs to.

Figure 7:
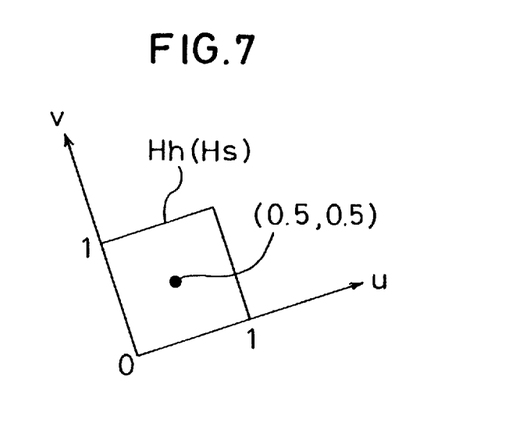
FIG. 7 is a diagram illustrative of a spot function.

Thereafter, a blackening sequence for each pixel P is determined for each halftone dot cell Hh and each halftone dot cell Hs in a step S4. The blackening sequence is defined by a common spot function f(u, v) for each halftone dot cell Hh and each halftone dot cell Hs. The spot function f(u, v) is a function to define the shape of a blackened halftone dot, i.e., a function representing a blackening sequence for a pixel in one halftone dot cell Hh and one halftone dot cell Hs. In this embodiment, the spot function f(u, v) is a function to increase a blackened portion in a circular pattern from the central coordinates (0.5, 0.5) of each halftone dot cell Hh and each halftone dot cell Hs, according to the following equation (5):

$$f(u, v)=(u-0.5)^2+(v-0.5)^2 \quad (5)$$

The equation (5) is defined to produce round dots and represents one example for the spot function f(u, v). To obtain a desired halftone dot pattern, the suitable spot function f(u, v) can be selected from various well-known functions. Further, even for a halftone dot pattern which can not be expressed by such functions, the spot function f(u, v) thereof may be prepared in a two-dimensional lookup table.

Then, the threshold A (see FIG. 2) of the supercell threshold template 45 is determined in a step S5. The supercell threshold template 45 has the same size as the supercell S, and hence is so called in that sense. The supercell threshold template 45 is a table in which the threshold A is determined in a 1:1 correspondence to each pixel position.

Figure 8:
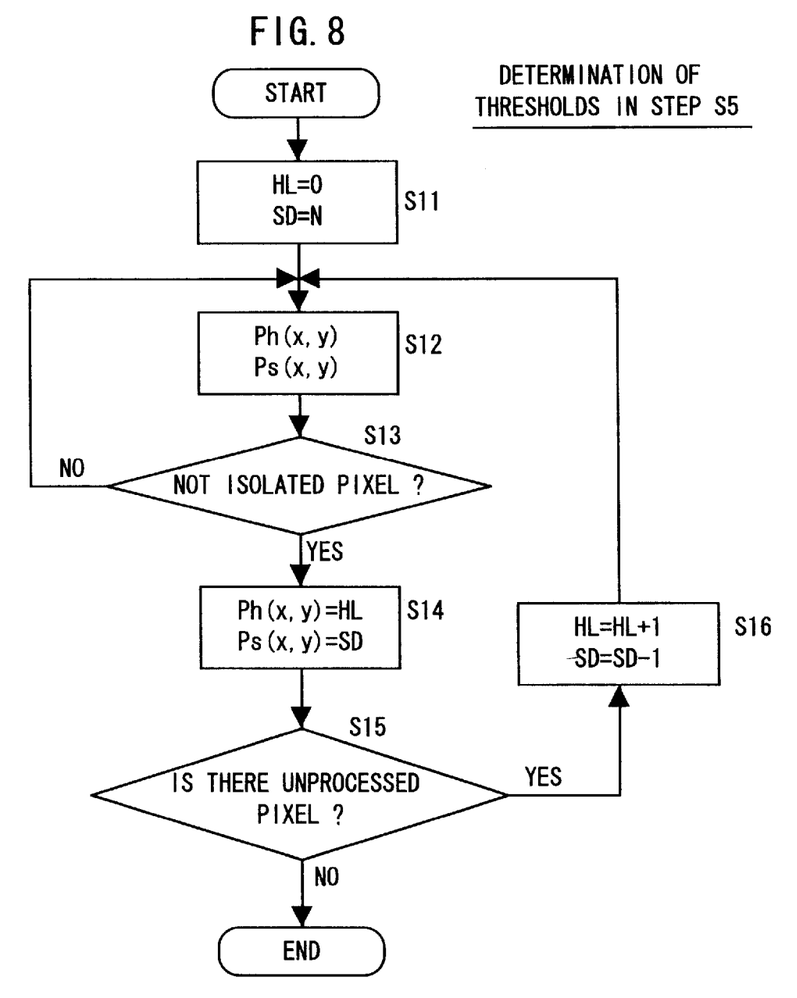
FIG. 8 is a detailed flowchart showing an algorithm of establishing a threshold.

FIG. 8 shows in detail an algorithm of establishing the threshold.

In this embodiment, it is assumed that the threshold A can take a value in the range of 0, 1, . . . , N, or actually a value in the range of 0, 1, . . . , 255.

The threshold A for a halftone dot cell Hh with a highlight point at center is represented by a threshold HL (A=HL), and the threshold A for a halftone dot cell Hs with a shadow point at center is represented by a threshold SD (A=SD). These thresholds HL, SD are set to initial values HL=0, SD=N in a step S11. A pixel which constitutes a halftone dot cell Hh is represented by a pixel Ph, and a pixel which constitutes a halftone dot cell Hs is represented by a pixel Ps. To establish the threshold HL for a pixel Ph, the pixel Ph is represented by Ph=HL, or, for an easier understanding, Ph (x, y)=HL in view of the fact that the position of the pixel Ph is determined by coordinates (x, y).

Then, a pixel Ph (x, y) which is the earliest in the blackening sequence in a halftone dot cell Hh is selected among unprocessed pixels (pixels for which no thresholds have been determined) in the supercell threshold template 45, and a pixel Ps (x, y) which is the latest in the blackening sequence in a halftone dot cell Hs is selected among unprocessed pixels in the supercell threshold template 45 in a step S12.

Figure 9:
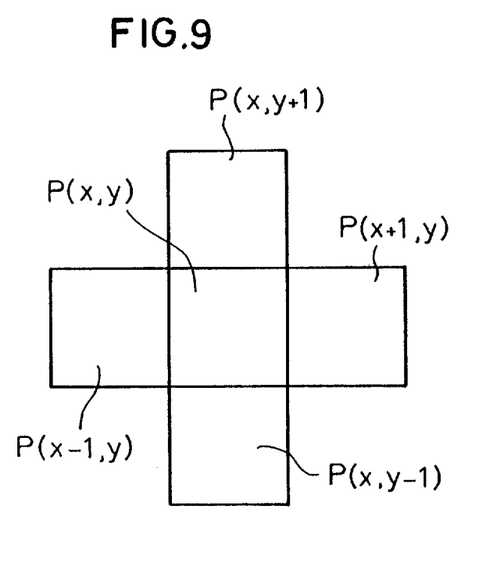
FIG. 9 is a diagram illustrative of unprocessed pixels for which no thresholds are determined.

Thereafter, it is confirmed that the selected pixels Ph (x, y), Ps (x, y) are not isolated pixels in a step S13. Specifically, as shown in FIG. 9, when a pixel P (x, y) is selected, then it is not isolated if either one of four pixels P (x, y+1), P (x, y−1), P (x−1, y), P (x+1, y) positioned around the pixel P (x, y) is a pixel for which the threshold A has been determined (a pixel for which the threshold A has been determined is referred to as a processed pixel).

If the selected pixels Ph (x, y), Ps (x, y) are not isolated pixels in the step S13, then the thresholds A for the selected pixels Ph (x, y), Ps (x, y) are set respectively to Ph (x, y)=HL and Ps (x, y)=SD in a step S14.

Then, it is determined whether there is an unprocessed pixel for which no threshold A has been determined in a step S15.

If there is an unprocessed pixel, then the thresholds HL, SD are changed to HL=HL+1 (in this case HL=1) and SD=SD+1 (in this case SD=N−1) in a step S16.

Then, the steps S2 through S6 are repeated until there is no unprocessed pixel in the step S15, i.e., until the thresholds A are determined for all the pixels Ph (x, y), Ps (x, y).

Figure 10:
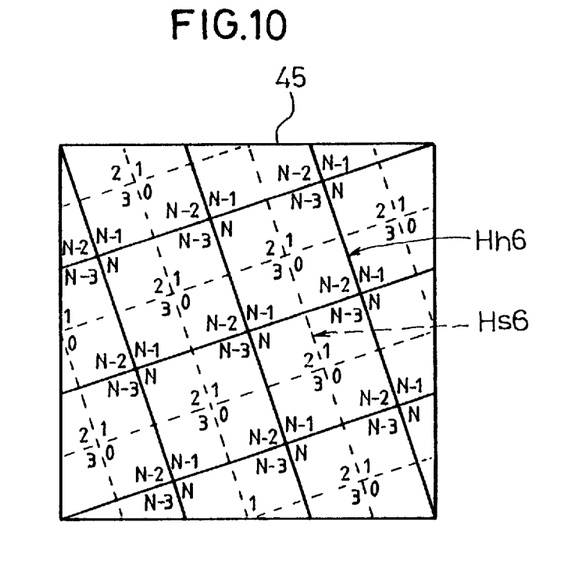
FIG. 10 is a diagram of a threshold template in which thresholds are determined.

FIG. 10 schematically shows the supercell threshold template 45 in which the thresholds HL for the halftone dot cells Hh each with a highlight point at center have been set to four values, i.e., HL=0, 1, 2, 3, and the thresholds SD for the halftone dot cells Hs each with a shadow point at center have been set to four values, i.e., HL=N, N−1, N−2, N−3.

A review of FIG. 10 indicates that the thresholds HL are determined as HL=0, 1, 2, 3 about the centers of the halftone dot cells Hh each with a highlight point at center, and the thresholds SD are determined as HL=N, N−1, N−2, N−3 about the centers of the halftone dot cells Hs each with a shadow point at center. Specifically, the thresholds A are alternately determined in the order of 0→N→1→N−1→, . . . →3→N−3.

When a value in the vicinity of the threshold A=N/2 is to be assigned in the above process of alternately determining the thresholds A, if a pixel position Ph (x, y) in a halftone dot cell Hh with a highlight point at center and a pixel position Ps (x, y) in a halftone dot cell Hs with a shadow point at center are aligned with each other, then the value in the vicinity of the threshold A=N/2 is assigned to the pixel position P (x, y) in the halftone dot cell which has been assigned earlier.

All the thresholds A in the supercell threshold template 45 are determined according to the above procedure. The supercell threshold template 45 in which the thresholds A have been determined is stored in a memory device such as a ROM, and employed in the binary data generating apparatus 41 shown in FIG. 2.

In this embodiment, when a supercell S is divided into halftone dot cells, it is divided into halftone dot cells Hh each with a highlight point at center and halftone dot cells Hs each with a shadow point at center, and thresholds HL assigned to respective pixels Ph in the halftone dot cells Hh each with a highlight point at center and thresholds SD assigned to respective pixels Ps in the halftone dot cells Hs each with a shadow point at center are alternately determined. Therefore, when a halftone dot image is produced from an original image having a high density tending to create moire stripes, or image data are outputted with a halftone dot percentage of about 90% or more, the number of blackened pixels in the halftone dot cells Hh each with a highlight point at center and the number of blank pixels in the halftone dot cells Hs each with a shadow point at center are equalized to each other, thus preventing moire stripes from being produced in the halftone dot image.

Figure 11:
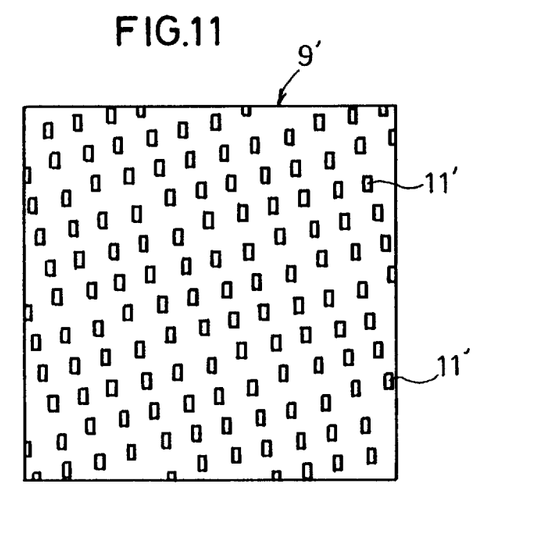
FIG. 11 is a diagram of a simulated output image with no moirè stripes produced according to the present invention when image data are outputted with a high halftone dot percentage.

FIG. 11 shows a simulated output image 9', similar to the output image shown in FIG. 15, produced according to the present invention when image data are outputted with a high halftone dot percentage. In FIG. 11, square dots 11' represent blank pixels, with other pixels being blackened. It can be understood from FIG. 11 that no moire stripes are produced in the output image 9'.

The principles of the present invention are applicable to the tilted supercell S shown in FIG. 14 as well as the untilted supercell S shown in FIG. 4.

Although a certain preferred embodiment of the present invention has been shown and described in detail, it should be understood that various changes and modifications may be made therein without departing from the scope of the appended claims.

What is claimed is:

1. A method of establishing halftone dot thresholds by establishing a supercell on a pixel grid determined by an output resolution, dividing the supercell into halftone dot cells, and assigning a threshold to each of pixels in the halftone dot cells, comprising the steps of:

dividing the supercell into halftone dot cells each with a highlight point at center and halftone dot cells each with a shadow point at center, with said halftone dot cells each with a highlight point at center having vertexes aligned with the centers of said halftone dot cells each with a shadow point at center; and alternately determining thresholds assigned to respective pixels in the halftone dot cells each with a highlight point at center and thresholds assigned to respective pixels in the halftone dot cells each with a shadow point at center.

2. A method according to claim 1, wherein the thresholds are alternately assigned to the pixels while confirming that each pixel selected for establishing a threshold is not an isolated pixel with no thresholds established for pixels disposed around said pixel.

3. A method according to claim 1, wherein when said thresholds have a value in the range of 0, 1, . . . , N, the thresholds are assigned by:

assigning the value of 0 to a threshold corresponding to a pixel which is the earliest in a blackening sequence in said halftone dot cells each with a highlight point at center, and assigning the value of N to a threshold corresponding to a pixel which is the latest in a blackening sequence in said halftone dot cells each with a shadow point at center;

then, assigning the value of 1 to a threshold corresponding to a pixel which is the next earliest in the blackening sequence in said halftone dot cells each with a highlight point at center, and assigning the value of (N−1) to a threshold corresponding to a pixel which is the second latest in the blackening sequence in said halftone dot cells each with a shadow point at center;

successively assigning the values of {2, (N−2)}, {3, (N−3)}, . . . to thresholds in said halftone dot cells; and if a pixel position in a halftone dot cell with a highlight point at center and a pixel position in a halftone dot cell with a shadow point at center are aligned with each other when a value in the vicinity of the value of (N/2) is to be assigned, then the value in the vicinity of said value of (N/2) is assigned to the pixel position in the halftone dot cell which has been assigned earlier.

4. A method according to claim 1, wherein when said thresholds have a value in the range of 0, 1, ..., N, the thresholds are assigned by:

assigning the value of 0 to a threshold corresponding to a pixel which is the earliest in a blackening sequence in said halftone dot cells each with a highlight point at center, and assigning the value of N to a threshold corresponding to a pixel which is the latest in a blackening sequence in said halftone dot cells each with a shadow point at center;

then, assigning the value of 1 to a threshold corresponding to a pixel which is the next earliest in the blackening sequence in said halftone dot cells each with a highlight point at center, and assigning the value of (N-1) to a threshold corresponding to a pixel which is the second latest in the blackening sequence in said halftone dot cells each with a shadow point at center;

successively assigning the values of {2, (N-2)}, {3, (N-3)}, ... to thresholds in said halftone dot cells while confirming that each pixel selected for establishing a threshold is not an isolated pixel with no thresholds established for pixels disposed around said pixel when thresholds having the values of 1 and (N-1) are to be assigned; and if a pixel position in a halftone dot cell with a highlight point at center and a pixel position in a halftone dot cell with a shadow point at center are aligned with each other when a value in the vicinity of the value of (N/2) is to be assigned, then the value in the vicinity of said value of (N/2) is assigned to the pixel position in the halftone dot cell which has been assigned earlier.

5. An apparatus for generating binary data by comparing original image data with a supercell threshold template, comprising:

means for generating the supercell threshold template by establishing a supercell on a pixel grid determined by an output resolution, dividing the supercell into halftone dot cells, and assigning a threshold to each of pixels in the halftone dot cells, said means comprising:

means for dividing the supercell into halftone dot cells each with a highlight point at center and halftone dot cells each with a shadow point at center, with said halftone dot cells each with a highlight point at center having vertexes aligned with the centers of said halftone dot cells each with a shadow point at center; and means for alternately determining thresholds assigned to respective pixels in the halftone dot cells each with a highlight point at center and thresholds assigned to respective pixels in the halftone dot cells each with a shadow point at center.

6. An apparatus according to claim 5, wherein the thresholds are alternately assigned to the pixels while confirming that each pixel selected for establishing a threshold is not an isolated pixel with no thresholds established for pixels disposed around said pixel.

7. An apparatus according to claim 5, wherein when said thresholds have a value in the range of 0, 1, ..., N, the thresholds are assigned by:

assigning the value of 0 to a threshold corresponding to a pixel which is the earliest in a blackening sequence in said halftone dot cells each with a highlight point at center, and assigning the value of N to a threshold corresponding to a pixel which is the latest in a blackening sequence in said halftone dot cells each with a shadow point at center;

then, assigning the value of 1 to a threshold corresponding to a pixel which is the next earliest in the blackening sequence in said halftone dot cells each with a highlight point at center, and assigning the value of (N-1) to a threshold corresponding to a pixel which is the second latest in the blackening sequence in said halftone dot cells each with a shadow point at center;

successively assigning the values of {2, (N-2)}, {3, (N-3)}, ... to thresholds in said halftone dot cells; and if a pixel position in a halftone dot cell with a highlight point at center and a pixel position in a halftone dot cell with a shadow point at center are aligned with each other when a value in the vicinity of the value of (N/2) is to be assigned, then the value in the vicinity of said value of (N/2) is assigned to the pixel position in the halftone dot cell which has been assigned earlier.

8. An apparatus according to claim 5, wherein when said thresholds have a value in the range of 0, 1, ..., N, the thresholds are assigned by:

assigning the value of 0 to a threshold corresponding to a pixel which is the earliest in a blackening sequence in said halftone dot cells each with a highlight point at center, and assigning the value of N to a threshold corresponding to a pixel which is the latest in a blackening sequence in said halftone dot cells each with a shadow point at center;

then, assigning the value of 1 to a threshold corresponding to a pixel which is the next earliest in the blackening sequence in said halftone dot cells each with a highlight point at center, and assigning the value of (N-1) to a threshold corresponding to a pixel which is the second latest in the blackening sequence in said halftone dot cells each with a shadow point at center;

successively assigning the values of {2, (N-2)}, {3, (N-3)}, ... to thresholds in said halftone dot cells while confirming that each pixel selected for establishing a threshold is not an isolated pixel with no thresholds established for pixels disposed around said pixel when thresholds having the values of 1 and (N-1) are to be assigned; and if a pixel position in a halftone dot cell with a highlight point at center and a pixel position in a halftone dot cell with a shadow point at center are aligned with each other when a value in the vicinity of the value of (N/2) is to be assigned, then the value in the vicinity of said value of (N/2) is assigned to the pixel position in the halftone dot cell which has been assigned earlier.

9. An image film/plate-making system comprising:

an image input unit for reading an original image and outputting image data representing the original image;

an image processor for processing said image data into image data and outputting the image data;

a binary data generating apparatus for comparing the image data outputted from said image processor with a supercell threshold template to output binary image data;

an exposure device for outputting a film exposed to said binary image data;

said binary data generating apparatus comprising means for generating the supercell threshold template by establishing a supercell on a pixel grid determined by an output resolution, dividing the supercell into halftone dot cells, and assigning a threshold to each of pixels in the halftone dot cells, said means comprising:

means for dividing the supercell into halftone dot cells each with a highlight point at center and halftone dot cells each with a shadow point at center, with said halftone dot cells each with a highlight point at center having vertexes aligned with the centers of said halftone dot cells each with a shadow point at center; and means for alternately determining thresholds assigned to respective pixels in the halftone dot cells each with a highlight point at center and thresholds assigned to respective pixels in the halftone dot cells each with a shadow point at center.

10. An image film/plate-making system according to claim 9, wherein the thresholds are alternately assigned to the pixels while confirming that each pixel selected for establishing a threshold is not an isolated pixel with no thresholds established for pixels disposed around said pixel.

* * * * *